US012533875B2

(12) United States Patent
Kanki

(10) Patent No.: US 12,533,875 B2
(45) Date of Patent: Jan. 27, 2026

(54) PRINTER AND MAINTENANCE METHOD

(71) Applicant: SCREEN HOLDINGS CO., LTD., Kyoto (JP)

(72) Inventor: Koji Kanki, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 191 days.

(21) Appl. No.: 18/456,692

(22) Filed: Aug. 28, 2023

(65) Prior Publication Data

US 2024/0100833 A1 Mar. 28, 2024

(30) Foreign Application Priority Data

Sep. 22, 2022 (JP) ................................ 2022-151018

(51) Int. Cl.
*B41J 2/03* (2006.01)
*B41J 2/165* (2006.01)

(52) U.S. Cl.
CPC ............. *B41J 2/03* (2013.01); *B41J 2/16508* (2013.01)

(58) Field of Classification Search
CPC ...... B41J 2/16523; B41J 2/03; B41J 2/16532; B41J 2/16552; B41J 2/16585
See application file for complete search history.

(56) References Cited

U.S. PATENT DOCUMENTS 12,138,931 B2 * 11/2024 Muto ..................... B41J 2/1652
2009/0015626 A1 * 1/2009 Murayama ........... B41J 2/16547 347/30
2009/0278884 A1 11/2009 Karada
2011/0221824 A1 9/2011 Sakata et al.
2016/0200106 A1 7/2016 Nakano
2022/0169027 A1 6/2022 Watanabe et al.

FOREIGN PATENT DOCUMENTS

JP 2001260392 A * 9/2001
JP 2009-269339 A 11/2009
JP 2015-080913 A 4/2015
JP 2016129956 A * 7/2016
WO 2010/041519 A1 4/2010

OTHER PUBLICATIONS

Extended European Search Report issued in European Patent Application No. 23194175.8, dated Feb. 5, 2024.

* cited by examiner

*Primary Examiner* — Sharon Polk
(74) *Attorney, Agent, or Firm* — Rimon P.C.

(57) ABSTRACT

A technique allows sucking ink adhering to the lower surface of a head and preventing the ink from being sucked out from the inside of nozzles of the head. The printer includes a head that ejects ink and a maintenance unit that performs maintenance of the head. The head has a lower surface that includes a nozzle face provided with a plurality of nozzles and side faces located adjacent to the nozzle face. The maintenance unit includes a cleaning block that sucks the ink from the lower surface of the head. The cleaning block has an upper surface that includes a first region that faces the nozzle face and second regions that face the side faces. The suction force acting on the first region is smaller than the suction force acting on the second regions. This reduces the possibility that the ink is sucked out from the inside of the nozzles of the head.

11 Claims, 11 Drawing Sheets

PRINTER AND MAINTENANCE METHOD

RELATED APPLICATIONS

This application claims priority from Japanese Application No. 2022-151018, filed on Sep. 22, 2022. The disclosure of which is incorporated by reference herein.

BACKGROUND OF THE INVENTION

Field of the Invention

The present invention relates to a technique for performing maintenance of heads of a printer that performs printing on a long band-like printing medium by an inkjet method.

Description of the Background Art

Printers are heretofore known for printing an image on a long band-like printing medium by ejecting ink to the surface of the printing medium while transporting the printing medium in a longitudinal direction. The printers include heads each including a plurality of nozzles for ejecting ink.

This type of printers may perform a purging operation of continuously ejecting ink from a plurality of nozzles in order to avoid clogging in the nozzles. The purging operation expels foreign materials in the ink or flocculation of the ink itself from the nozzles. This results in avoiding clogging in the nozzles.

For example, Japanese Patent Application Laid-Open No. 2015-080913 describes a conventional printer that performs a purging operation.

SUMMARY OF THE INVENTION

Technical Problem

However, the purging operation may cause the ink to adhere to the lower surfaces of the heads provided with the nozzles. Thus, it is necessary to remove the ink adhering to the lower surfaces of the heads after the purging operation.

As a method for removing the ink adhering to the lower surfaces of the heads, for example, a method is conceivable in which ink is sucked from the lower surfaces of the heads. However, if a strong suction force acts on the nozzles, the ink inside the nozzles may be sucked out. Normally, the interface of the ink forms meniscus in the nozzles. If the ink inside the nozzles is sucked out, the meniscus may collapse and become the cause of ejection failures.

The present invention has been made in light of such circumstances, and it is an object of the present invention to provide a technique of sucking ink adhering to the lower surfaces of heads while preventing the ink from being sucked out from the insides of nozzles of the heads.

Solution to Problem

A first aspect of the present application is a printer for performing printing on a long band-like printing medium by an inkjet method. The printer includes a head that ejects ink, and a maintenance unit that performs maintenance of the head. The head has a lower surface that includes a nozzle face provided with a plurality of nozzles for ejecting ink, and a side face located adjacent to the nozzle face. The maintenance unit includes a cleaning block that sucks ink from the lower surface of the head. The cleaning block has an upper surface that includes a first region that faces the nozzle face and a second region that faces the side face. A suction force acting on the first region is smaller than a suction force acting on the second region.

According to the first aspect of the present application, the ink adhering to the lower surface of the head can be sucked by the cleaning block. Besides, the suction force acting on the first region of the upper surface of the cleaning block that faces the nozzle face is smaller than the suction force acting on the second region that faces the side face of the upper surface of the cleaning block. This prevents the ink from being sucked out from the inside of the nozzles of the head.

A second aspect of the present application is the printer according to the first aspect, in which the cleaning block has an upper surface provided with a plurality of vacuum holes for sucking ink, and a density of the plurality of vacuum holes in the first region is smaller than a density of the plurality of vacuum holes in the second region.

A third aspect of the present application is the printer according to the second aspect, in which the plurality of vacuum holes are not provided in the first region.

A fourth aspect of the present application is the printer according to any one of the first to third aspects, in which the side face protrudes downward from the nozzle face.

A fifth aspect of the present application is the printer according to any one of the first to third aspects that further includes a pressure mechanism that supplies ink to the head while applying pressure to the ink so as to continuously eject the ink from the plurality of nozzles.

According to the fifth aspect of the present application, after clogging in the nozzles is resolved by the purging operation, the ink adhering to the lower surface of the head can be sucked by the cleaning block.

A sixth aspect of the present application is the printer according to any one of the first to third aspects, in which the cleaning block further includes a plurality of supply holes for supplying a cleaning liquid to the lower surface of the head.

According to the sixth aspect of the present application, the cleaning liquid can be supplied to the lower surface of the head. This allows the lower surface of the head to be cleaned more satisfactorily.

A seventh aspect of the present application is the printer according to the sixth aspect, in which the plurality of supply holes are provided in both of the first region and the second region.

According to the seventh aspect of the present application, both the nozzle face and side face of the head can be cleaned with the cleaning liquid.

An eighth aspect of the present application is the printer according to any one of the first to third aspects, in which the nozzle face and the side face extend in a width direction of the printing medium. The printer further includes a movement mechanism that moves the cleaning block relative to the head in the width direction.

According to the eighth aspect of the present application, the ink adhering to the lower surface of the head can be sucked by the cleaning block while moving the cleaning block relative to the head in the width direction.

A ninth aspect of the present application is a maintenance method for performing maintenance of a head of a printer that performs printing on a long band-like printing medium by an inkjet method. The maintenance method includes a cleaning operation of sucking ink adhering to a lower surface of the head into a cleaning block. The head has the lower surface that includes a nozzle face provided with a plurality of nozzles for ejecting ink and a side face located adjacent to the nozzle face. The cleaning block has an upper surface that includes a first region that faces the nozzle face and a second region that faces the side face. A suction force acting on the first region is smaller than a suction force acting on the second region.

According to the ninth aspect of the present application, the head adhering to the lower surface of the head can be sucked by the cleaning block. Besides, the suction force acting on the first region of the upper surface of the cleaning block that faces the nozzle face is smaller than the suction force acting on the second region that faces the side face of the upper surface of the cleaning block. This prevents the ink from being sucked out from the inside of the nozzles of the head.

A tenth aspect of the present application is the maintenance method according to the ninth aspect that further includes a purging operation of supplying ink to the head while applying pressure to the ink so as to continuously eject the ink from the plurality of nozzles. The cleaning operation is performed after the purging operation.

According to the tenth aspect of the present application, after clogging in the nozzles is resolved in the purging process, the ink adhering to the lower surface of the head can be removed in the cleaning process.

An eleventh aspect of the present application is the maintenance method according to the ninth or tenth aspect, in which in the cleaning operation, the cleaning block sucks the ink while supplying a cleaning liquid to the lower surface of the head.

According to the eleventh aspect of the present application, the lower head of the head can be cleaned more satisfactorily by supplying the cleaning liquid to the lower surface of the head.

A twelfth aspect of the present application is the maintenance method according to the ninth or tenth aspect, in which the nozzle face and the side face extend in a width direction of the printing medium, and in the cleaning operation, the cleaning block sucks the ink while moving in the width direction relative to the head.

According to the twelfth aspect of the present application, the ink adhering to the lower surface of the head can be sucked by the cleaning block while moving the cleaning block relative to the head in the width direction.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the drawings.

1. Configuration of Printing System

Figure 1:
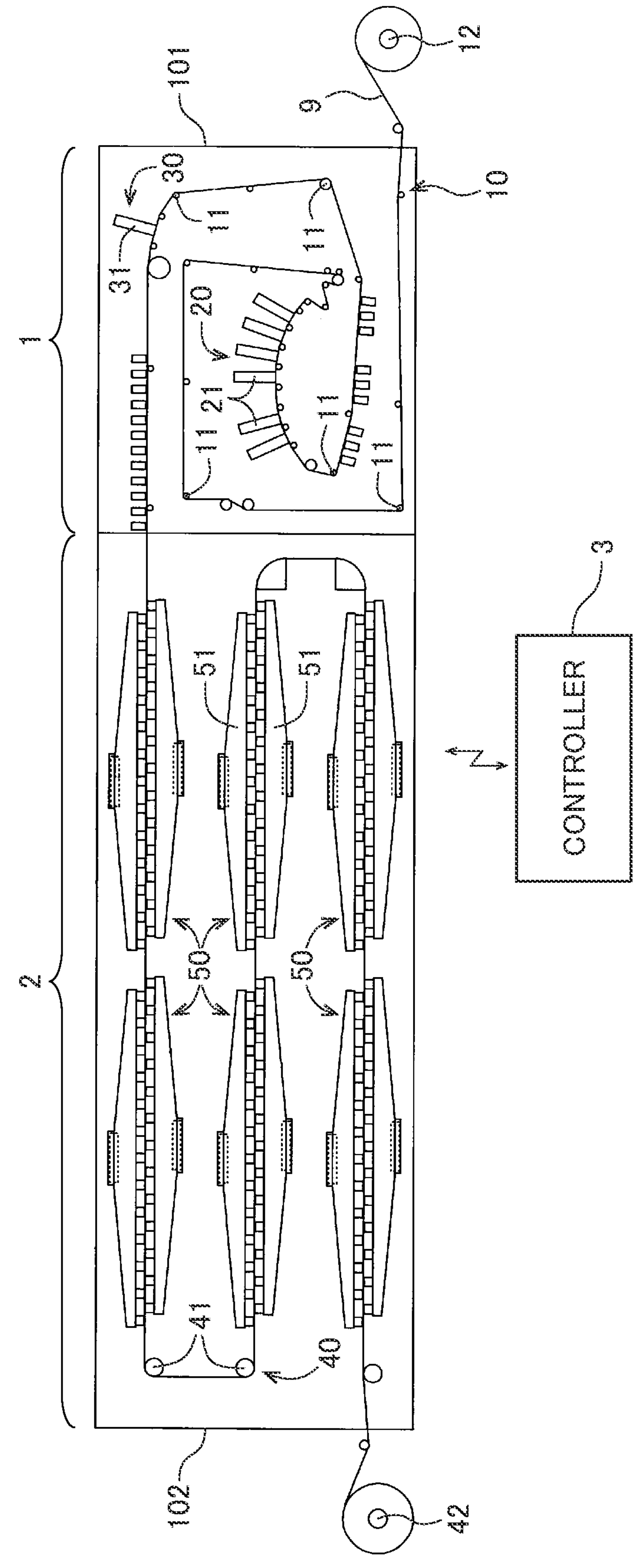
FIG. 1 is a diagram showing a configuration of a printing system.

FIG. 1 is a diagram showing a configuration of a printing system 100 that includes a printer 1 according to one embodiment of the present invention. The printing system 100 is a system for performing printing and drying on a long band-like printing medium 9 while transporting the printing medium 9 in a longitudinal direction. The printing medium 9 is a soft sheet having flexibility. For example, the printing medium 9 may be a resin film such as oriented polypropylene (OPP) or polyethylene terephthalate (PET) for flexible packaging. Alternatively, the printing medium 9 may be printing paper.

As shown in FIG. 1, the printing system 100 includes the printer 1, a drier 2, and a controller 3. The printer 1 and the drier 2 are arranged adjacent to each other.

Figure 2:
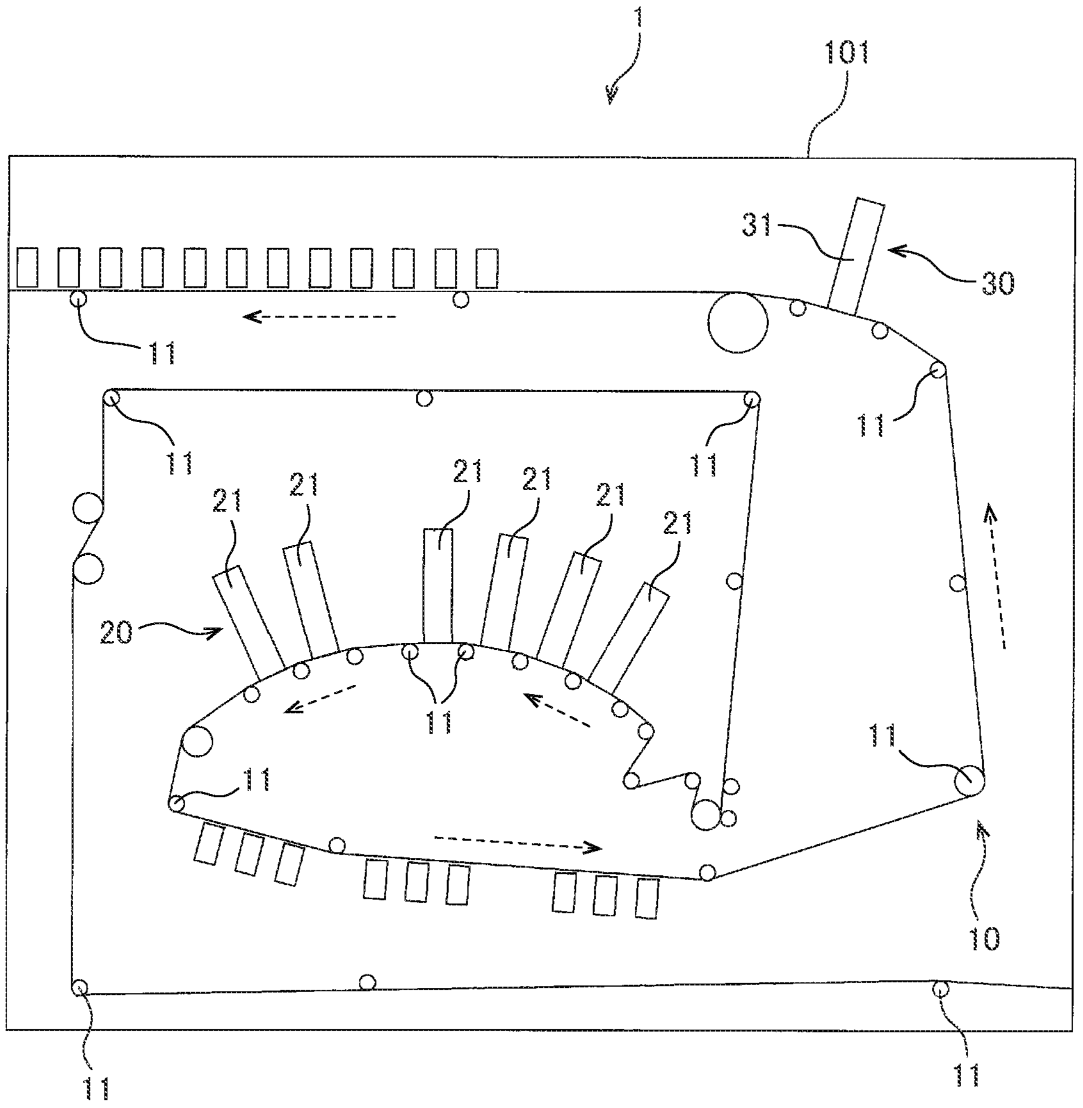
FIG. 2 is a diagram showing a configuration of a printer.

The printer 1 is a device for performing printing on the surface of the printing medium 9 by an inkjet method. FIG. 2 is a diagram showing a configuration of the printer 1. As shown in FIGS. 1 and 2, the printer 1 includes a first transport mechanism 10, a color printer 20, and a white printer 30. The first transport mechanism 10, the color printer 20, and the white printer 30 are housed in a box-like housing 101.

The first transport mechanism 10 is a mechanism for transporting the printing medium 9 in a transport direction along the length of the printing medium 9 inside the housing 101 of the printer 1. The first transport mechanism 10 includes a plurality of first transport rollers 11. The printing medium 9 is fed out from a feed roller 12 arranged outside the housing 101 and transported along a transport path configured by the first transport rollers 11. Each first transport roller 11 guides the printing medium 9 to the downstream side of the transport path by rotating about an axis extending in parallel with the width direction of the printing medium 9.

The color printer 20 is a part that ejects aqueous-based color ink to the printing medium 9 transported by the first transport mechanism 10. As shown in FIG. 1, the color printer 20 includes a plurality of head units 21. The head units 21 are aligned at intervals in the transport direction of the printing medium 9. The printing medium 9 is transported below the head units 21, with its printing surface facing upward.

In the example shown in FIGS. 1 and 2, the color printer 20 includes six head units 21. However, the number of head units 21 included in the color printer 20 may be any number in the range of one to five, or may be seven or more.

The head units 21 eject color ink toward the upper surface of the printing medium 9. In the present embodiment, the color ink refers to ink of colors other than white. The color ink may include, for example, cyan ink, magenta ink, yellow ink, and black ink. Each of the head units 21 ejects ink of a different color. Accordingly, a multicolor image is formed on the upper surface of the printing medium 9.

The white printer 30 is a part that ejects aqueous-based white ink to the printing medium 9 transported by the first transport mechanism 10. The white printer 30 is arranged downstream of the color printer 20 in the transport path of the printing medium 9. As shown in FIG. 1, the white printer 30 includes one head unit 31. The printing medium 9 is transported below the head unit 31, with its printing surface facing upward.

The head unit 31 ejects white ink toward the upper surface of the printing medium 9. The white ink refers to white color ink. The white ink ejected from the head unit 31 forms a white color image on the upper surface of the printing medium 9.

The drier 2 is a device that dries and fixes ink on the printing medium 9. As shown in FIG. 1, the drier 2 includes a second transport mechanism 40 and a plurality of blast units 50. The second transport mechanism 40 and the blast units 50 are housed in a box-like drying furnace 102.

The second transport mechanism 40 is a mechanism for transporting the printing medium 9 in a transport direction along the length of the printing medium 9 inside the drying furnace 102. The second transport mechanism 40 includes a plurality of second transport rollers 41. The printing medium 9 is transported by the first transport mechanism 10 and then transferred from the first transport mechanism 10 to the second transport mechanism 40. Then, the printing medium 9 is transported along a transport path configured by the second transport rollers 41 inside the drying furnace 102. Each second transport roller 41 guides the printing medium 9 to the downstream side of the transport path by rotating about an axis extending in parallel with the width direction of the printing medium 9. The transported printing medium 9 is collected by a take-up roller 42 arranged outside the drying furnace 102.

The blast units 50 are arranged along the transport path of the printing medium 9 inside the drying furnace 102. Each of the blast units 50 includes a pair of blast chambers 51. The printing medium 9 passes between the pair of blast chambers 51. Each blast chamber 51 blows warm air toward the printing medium 9. The warm air may, for example, be a gas heated to 60° C. or higher. Accordingly, the ink adhering to the surface of the printing medium 9 is dried. As a result, the ink is fixed to the surface of the printing medium 9.

Figure 3:
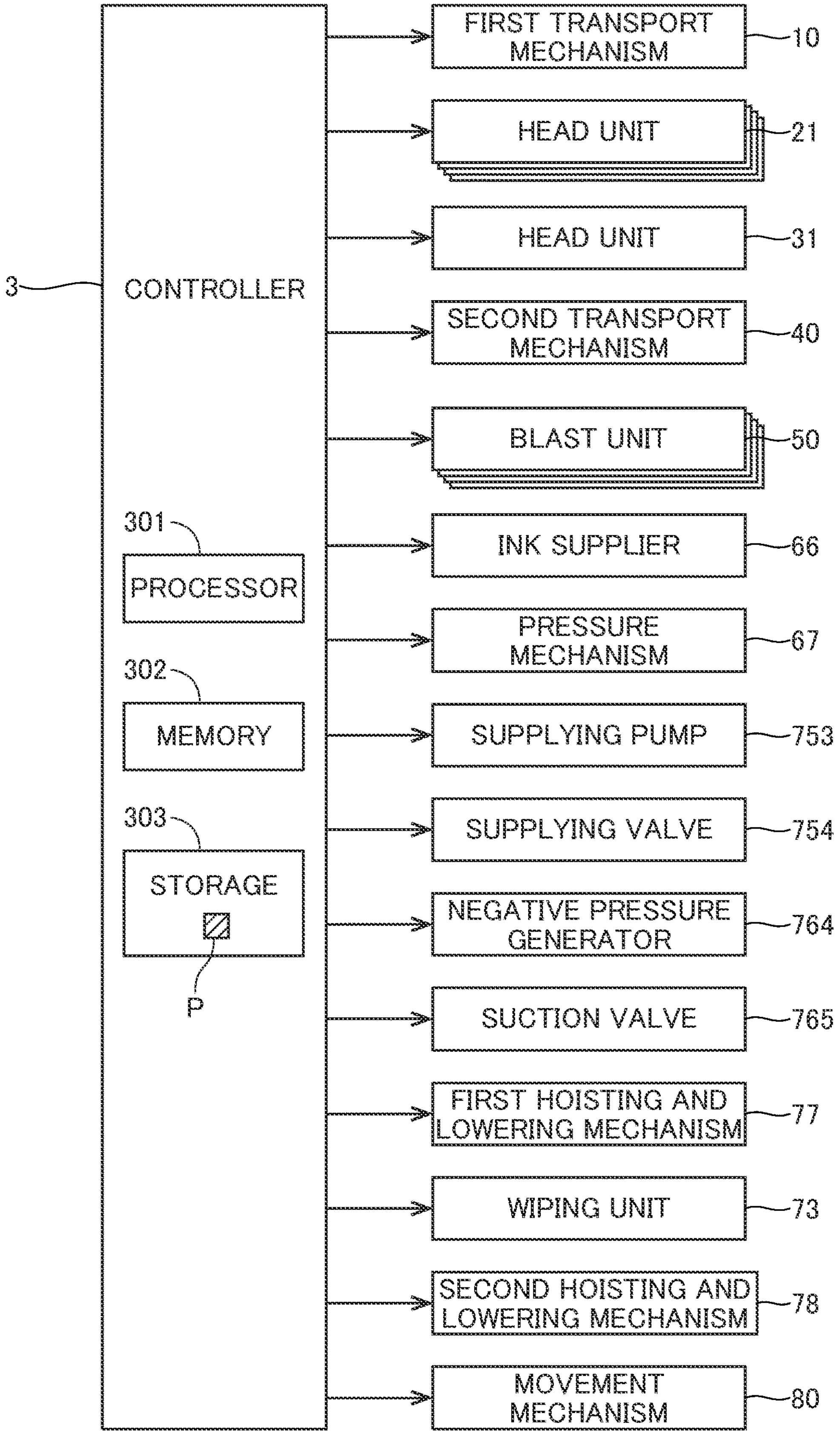
FIG. 3 is a control block diagram of the printing system.

The controller 3 is a unit for controlling operations of each part of the printing system 100. FIG. 3 is a control block diagram of the printing system 100. As shown in FIG. 3, the controller 3 is configured as a computer that includes a processor 301 such as a CPU, memory 302 such as a RAM, and a storage 303 such as a hard disk drive. The storage 303 stores computer programs P for causing the computer to execute print processing, dry processing, and maintenance processing for maintenance of the head units 21 and 31.

As shown in FIG. 3, the controller 3 is electrically connected to the first transport mechanism 10, the head units 21 of the color printer 20, the head unit 31 of the white printer 30, the second transport mechanism 40, and the blast units 50 described above. The controller 3 is also electrically connected to an ink supplier 66, a pressure mechanism 67, a supplying pump 753, a supplying valve 754, a negative pressure generator 764, a suction valve 765, a first hoisting and lowering mechanism 77, a wiping unit 73, a second hoisting and lowering mechanism 78, and a movement mechanism 80, which will be described later.

The controller 3 controls operations of each part described above in accordance with the computer programs P stored in the storage 303. In this way, the print processing, the dry processing, and the maintenance processing for maintenance of the head units 21 and 31 proceed in the printing system 100.

2. Configuration of Head Units

Next, a detailed configuration of the head units 21 and 31 described above will be described. The head units 21 of the color printer 20 and the head unit 31 of the white printer 30 have similar structures. Thus, these head units 21 and 31 are collectively referred to as "head units 60," and the following description is given about only one of the head units 60.

Figure 4:
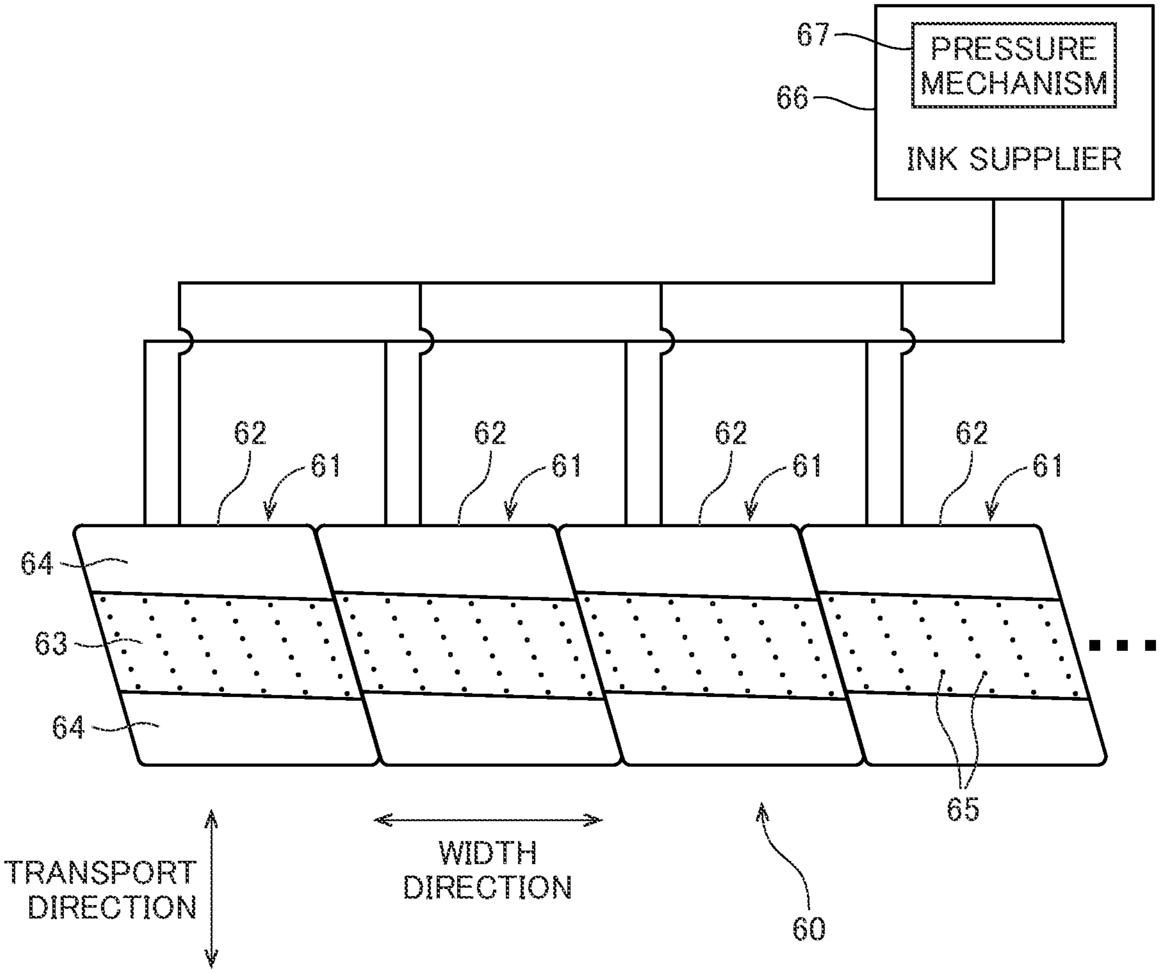
FIG. 4 is a bottom view of a head unit.
Figure 5:
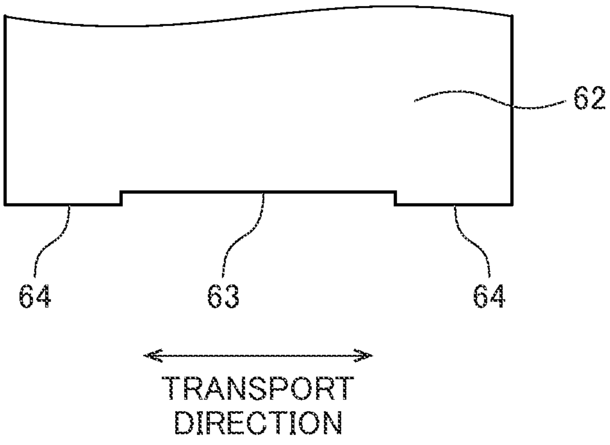
FIG. 5 is a diagram of the head unit when viewed in a width direction.

In the following description, the direction along the transport path of the printing medium 9 is referred to as a "transport direction," and the direction along the short sides of the printing medium 9 is referred to as a "width direction." FIG. 4 is a bottom view of the head unit 60. FIG. 5 is a diagram of the head unit 60 when viewed in the width direction.

As shown in FIG. 4, the head unit 60 includes a plurality of heads 61 for ejecting ink of the same color. The heads 61 are aligned in the width direction. Each head 61 includes a box-like casing 62. In the example shown in FIG. 3, the lower surface of the casing 62 has an approximately parallelogram shape. Alternatively, the lower surface of the casing 62 may have a rectangular shape.

As shown in FIGS. 4 and 5, the lower surface of the casing 62 of each head 61 includes a nozzle face 63 and a pair of side faces 64. The nozzle face 63 and the pair of side faces 64 are arranged in the transport direction. The nozzle face 63 is located between the pair of side faces 64. The nozzle face 63 and the pair of side faces 64 extend approximately parallel to one another in the width direction.

The nozzle face 63 includes a plurality of nozzles 65 capable of ejecting ink. The nozzles 65 are arranged in the width direction. In the example shown in FIG. 4, the nozzles 65 arranged in the width direction are staggered in the transport direction. By in this way arranging the nozzles 65 in two dimensions, it is possible to make the position of each nozzle 65 in the width direction close to one another. Alternatively, the nozzles 65 may be arranged in line in the width direction. Each nozzle 65 has an ink ejection outlet that is open downward.

The nozzles 65 eject droplets of ink in response to a command received from the controller 3. As the method of ejecting ink from the nozzles 65, for example, a so-called piezo-inkjet method may be used in which piezo-elements become deformed by the application of voltage so that ink in the nozzles 65 is ejected under pressure. Alternatively, the ink ejection method may be a so-called thermal-inkjet method in which ink in the nozzles 65 is ejected by heating and expanding the ink by applying power to a heater.

The pair of side faces 64 is provided on both sides of the nozzle face 63 in the transport direction. Each side face 64 is adjacent to the nozzle face 63 in the transport direction. As shown in FIG. 5, each side face 64 protrudes downward from the nozzle face 63. In other words, the nozzle face 63 is located above the pair of side faces 64. The nozzle face 63 and the pair of side faces 64 are flat surfaces parallel to one another.

As shown in FIG. 4, the printer 1 further includes an ink supplier 66. The ink supplier 66 is connected to each head 61 of the head unit 60 via piping. During the operations of the printer 1, ink is circuited between the ink supplier 66 and the head unit 60. The ink supplier 66 further includes a pressure mechanism 67. The pressure mechanism 67 is a mechanism for performing a purging operation during maintenance of the head unit 60, which will be described later. The pressure mechanism 67 forcefully supplies ink to each head 61 by applying pressure to the ink in the ink supplier 66. Accordingly, ink is continuously ejected from nozzles 65 of each head 61.

3. Maintenance of Head Unit

Figure 6:
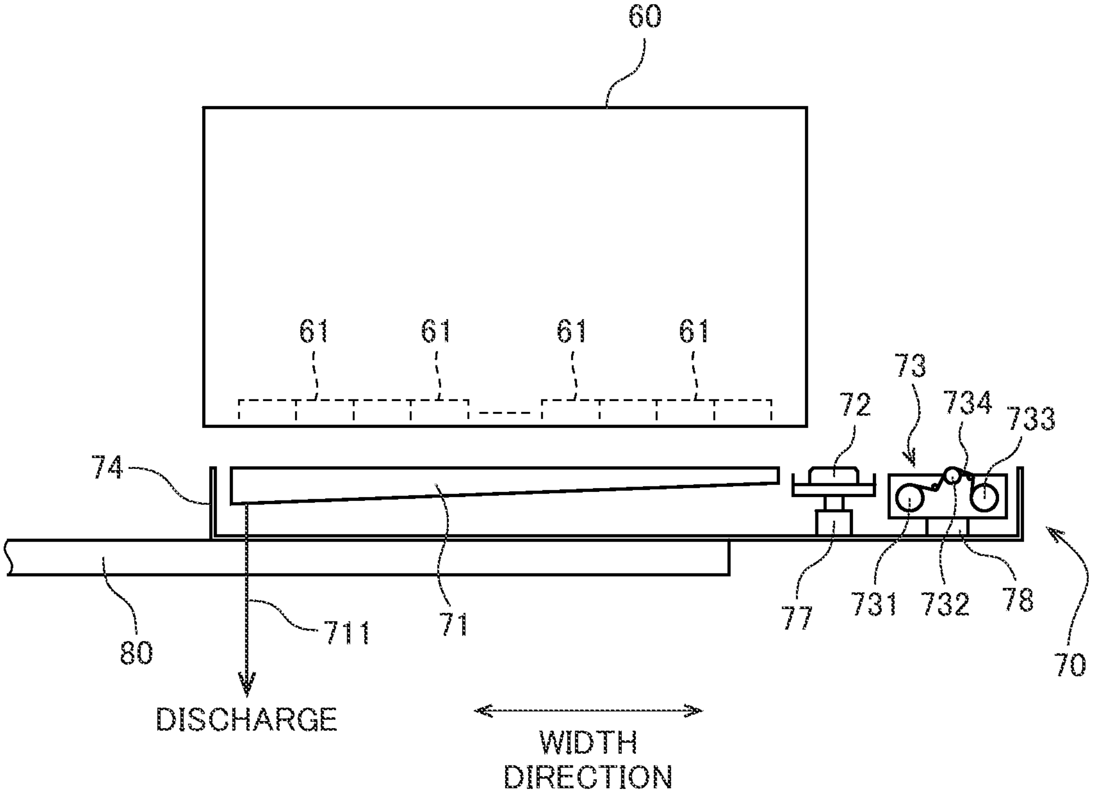
FIG. 6 is a diagram showing configurations of a head unit, a maintenance unit, and a movement mechanism.

Next, the maintenance of the aforementioned head unit 60 will be described. The printer 1 includes a maintenance unit 70 and a movement mechanism 80 for each head unit 60. FIG. 6 is a diagram showing configurations of the head unit 60, the maintenance unit 70, and the movement mechanism 80.

The head unit 60 is movable by a head movement mechanism (not shown) between a printing position that faces the printing surface of the printing medium 9 and a maintenance position deviated to the side from the transport path of the printing medium 9. The maintenance unit 70 performs maintenance such as cleaning on the head unit 60 located at the maintenance position.

As shown in FIG. 6, the maintenance unit 70 includes a cap 71, a cleaning block 72, a wiping unit 73, and a base frame 74. The cap 71, the cleaning block 72, and the wiping unit 73 are aligned in the width direction. The cap 71, the cleaning block 72, and the wiping unit 73 are supported by the base frame 74.

The cap 71 is a portion that covers the lower surfaces of the heads 61. The cap 71 has a bottom and side walls and has a shape whose top is open. The cap 71 collectively covers the lower surfaces of the heads 61 of one head unit 60. In the case of performing a purging operation, the cap 71 receives ink ejected from the heads 61. The cap 71 is connected to a drainage piping 711 at the bottom. The ink ejected from the heads 61 is discharged from the cap 71 to the drainage piping 711.

Figure 7:
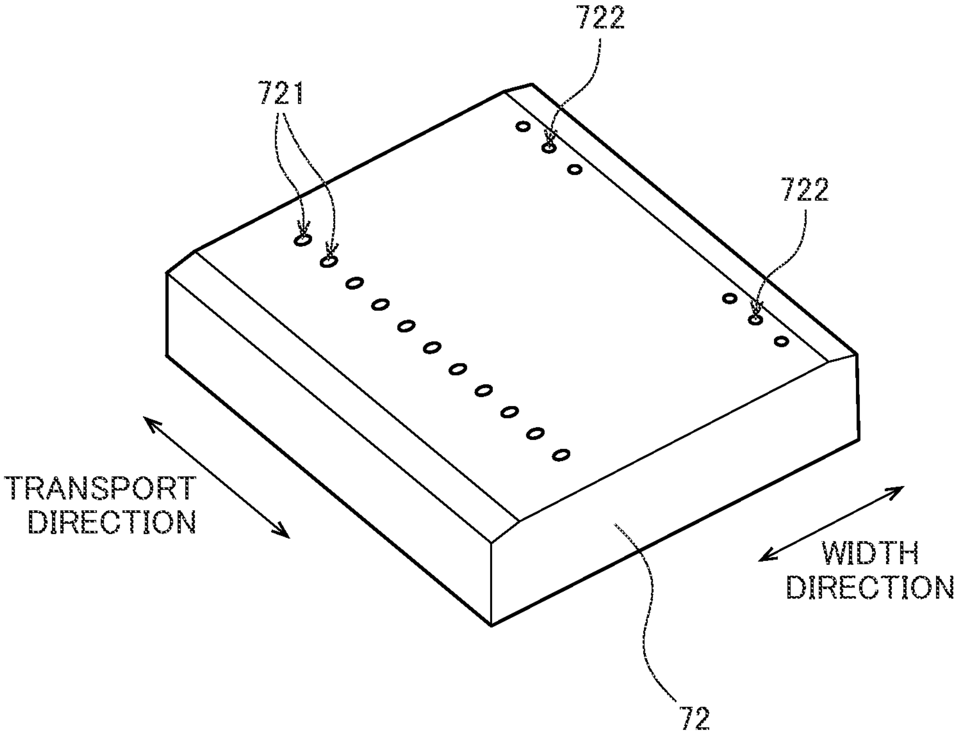
FIG. 7 is a perspective view of a cleaning block.
Figure 8:
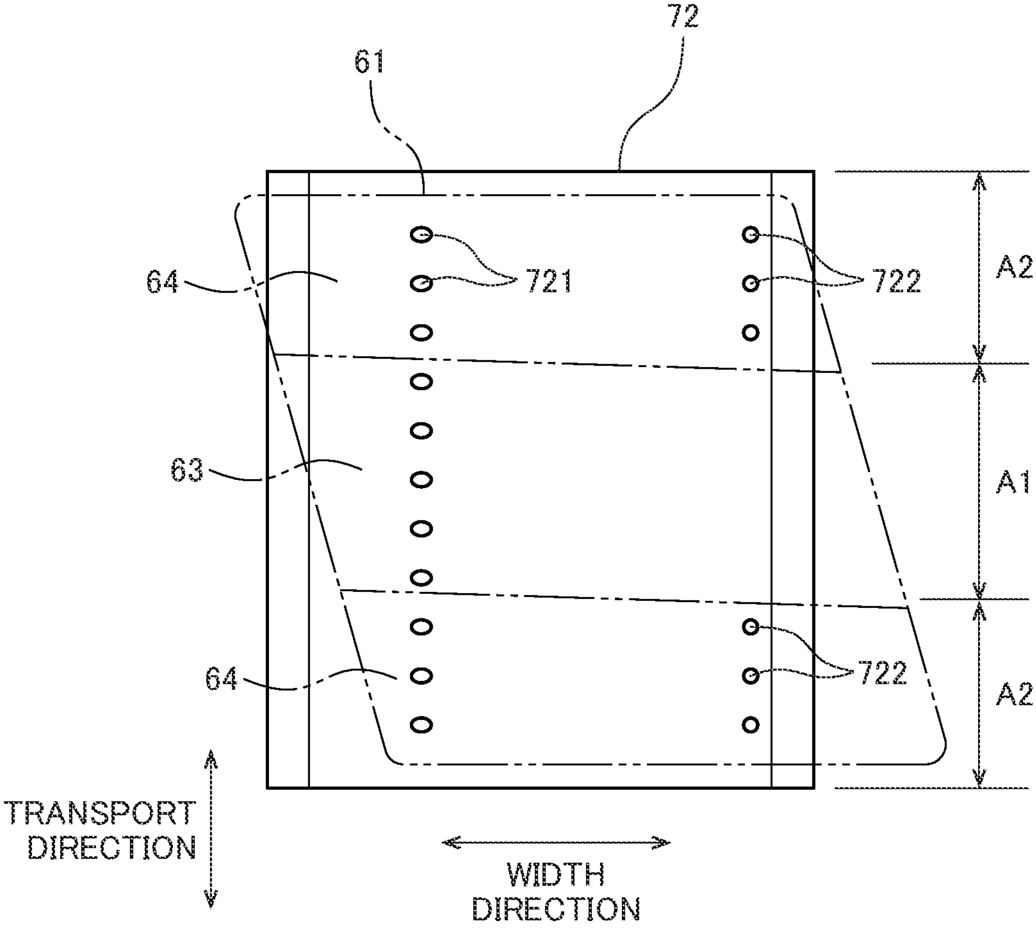
FIG. 8 is a top view of the cleaning block.

The cleaning block 72 is a unit that cleans the lower surfaces of the heads 61 to which the ink adheres. The cleaning block 72 is located between the cap 71 and the wiping unit 73 in the width direction. The cleaning block 72 has an upper surface that is parallel to the lower surfaces of the heads 61. FIG. 7 is a perspective view of the cleaning block 72. FIG. 8 is a top view of the cleaning block 72. As shown in FIGS. 7 and 8, the cleaning block 72 includes a plurality of supply holes 721 and a plurality of vacuum holes 722 in the upper surface.

The supply holes 721 are holes for supplying a cleaning liquid toward the lower surface of each head 61. The supply holes 721 are aligned in the transport direction in the upper surface of the cleaning block 72. The vacuum holes 722 are holes for sucking ink from the lower surface of each head 61. The vacuum holes 722 are aligned in the transport direction at a position away from the supply holes 721 in the width direction in the upper surface of the cleaning block 72.

Figure 9:
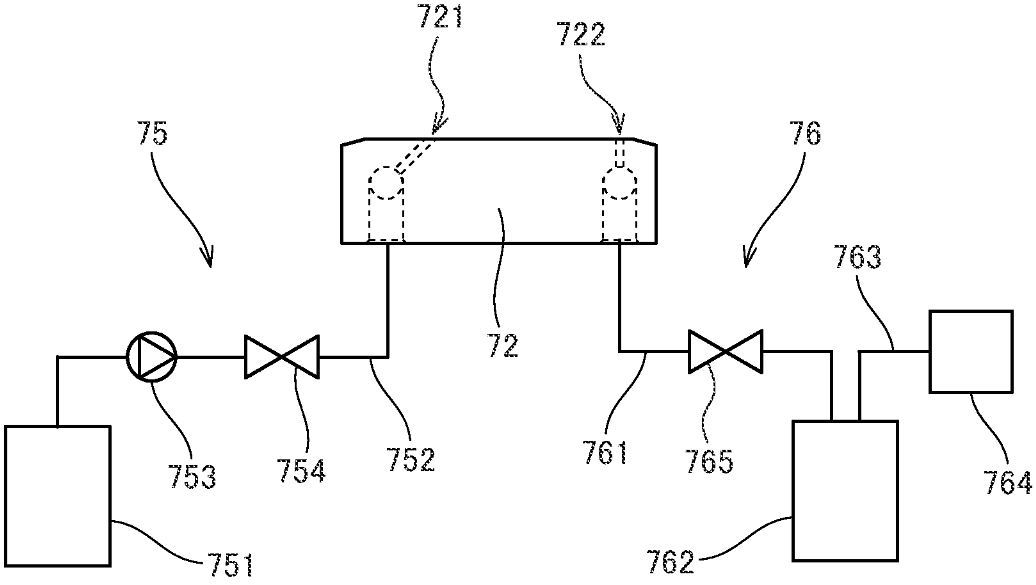
FIG. 9 is a diagram showing a configuration of a piping system connected to the cleaning block.

FIG. 9 is a diagram showing a configuration of a piping system connected to the cleaning block 72. As shown in FIG. 9, the maintenance unit 70 includes a cleaning liquid supplier 75 and a suction part 76.

The cleaning liquid supplier 75 includes a cleaning-liquid tank 751 and supply piping 752. The cleaning-liquid tank 751 stores a cleaning liquid for use in cleaning the lower surfaces of the heads 61. The cleaning liquid may, for example, be a solvent ink excluding colored components. The upstream end of the supply piping 752 is connected to the cleaning-liquid tank 751. The downstream end of the supply piping 752 is connected to the supply holes 721 through an internal flow passage of the cleaning block 72. A supplying pump 753 and a supplying valve 754 are provided in the path of the supply piping 752.

The supplying pump 753 is operated in response to a driving signal supplied from the controller 3. The supplying valve 754 opens and closes in accordance with a command received from the controller 3. When the supplying pump 753 is operated with the supplying valve 754 open, the cleaning liquid is supplied from the cleaning-liquid tank 751 to the cleaning block 72 through the supply piping 752. The cleaning liquid is then ejected from the supply holes 721 of the cleaning block 72.

The suction part 76 includes first suction piping 761, a trap tank 762, second suction piping 763, and a negative pressure generator 764. The upstream end of the first suction piping 761 is connected to the vacuum holes 722 through the internal flow passage of the cleaning block 72. The downstream end of the first suction piping 761 is connected to the trap tank 762. A suction valve 765 is provided in the path of the first suction piping 761. The upstream end of the second suction piping 763 is connected to the trap tank 762. The downstream end of the second suction piping 763 is connected to the negative pressure generator 764.

The negative pressure generator 764 may, for example, an ejector. Alternatively, the ejector may be replaced by any other device such as a pump. The negative pressure generator 764 operates in accordance with a command received from the controller 3. The suction valve 765 opens and closes in accordance with a command received from the controller 3. When the negative pressure generator 764 is operated with the suction valve 765 open, the gas inside the first suction piping 761, the trap tank 762, and the second suction piping 763 is sucked out to the negative pressure generator 764, and this generates a negative pressure in the vacuum holes 722. Accordingly, the ink and the cleaning liquid adhering to the lower surfaces of the heads 61 are sucked out into the vacuum holes 722. The sucked ink and cleaning liquid flow through the first suction piping 761 and are stored in the trap tank 762.

In the present embodiment, the supply holes 721 are open in a diagonally upward direction toward the vacuum holes 722. Alternatively, the direction of openings of the supply holes 721 may be in vertically upward direction. In the present embodiment, the vacuum holes 722 are open in a vertically upward direction. Alternatively, the direction of openings of the vacuum holes 722 may be in a diagonally upward direction.

As shown in FIG. 6, the maintenance unit 70 includes the first hoisting and lowering mechanism 77. The first hoisting and lowering mechanism 77 moves the cleaning block 72 up and down relative to the base frame 74 of the maintenance unit 70. Specifically, the first hoisting and lowering mechanism 77 moves the cleaning block 72 up and down between a first rising position at which the cleaning block 72 comes close to the lower surface of a head 61 and a first falling position lower than the first rising position. For example, the first hoisting and lowering mechanism 77 may be an air cylinder.

In FIG. 8, the position of a head 61 during cleaning by the cleaning block 72 is indicated by virtual lines (chain double-dashed lines). As shown in FIG. 8, the upper surface of the cleaning block 72 includes a first region A1 and a pair of second regions A2. The first region A1 is a region that faces the nozzle face 63 of the head 61 in the up-down direction during cleaning of the head 61 by the cleaning block 72. The second regions A2 are regions that face the side faces 64 of the head 61 in the up-down direction during cleaning of the head 61 by the cleaning block 72.

The supply holes 721 are provided in the first region A1 and the pair of second regions A2. That is, the supply holes 721 are provided at fixed intervals from one of the second regions A2 through the first region A1 to the other second region A2. Thus, the cleaning liquid ejected from the supply holes 721 is supplied to the nozzle face 63 and the pair of side faces 64 of the head 61. Accordingly, each of the nozzle face 63 and the pair of side faces 64 can be cleaned with the cleaning liquid.

On the other hand, the vacuum holes 722 are provided only in the pair of second regions A2, out of the first region A1 and the pair of second regions A2. That is, the vacuum holes 722 are not provided in the first region A1. This makes the suction force acting on the first region A1 smaller than the suction force acting on the second regions A2. Accordingly, it is possible to make the suction force acting on the nozzle face 63 of the head 61 smaller than the suction force acting on the side faces 64.

Inside the nozzles 65 provided in the nozzle face 63, the interface of the ink forms meniscus. If the ink is sucked out from the insides of the nozzles 65, this meniscus may collapse and become the cause of ejection failures. However, if the suction force acting on the nozzle face 63 is made smaller than the suction force acting on the side faces 64 as described above, it is possible to reduce the possibility that the ink may be sucked out from the insides of the nozzles 65. This reduces the occurrence of ink ejection failures from the nozzles 65.

The wiping unit 73 is a unit that wipes the ink and the cleaning liquid adhering to the lower surfaces of the heads 61. As shown in FIG. 6, the wiping unit 73 includes a supplying roller 731, a wiping roller 732, and a collecting roller 733. The supplying roller 731 and the collecting roller 733 are arranged at an interval in the width direction. The wiping unit 73 transports a band-like sheet 734 from the supplying roller 731 via the wiping roller 732 to the collecting roller 733. The material for the sheet 734 may, for example, be cloth or paper.

The wiping unit 73 brings the sheet 734 supported by the wiping roller 732 into contact with the pair of side faces 64 of a head 61. Then, with the sheet 734 sandwiched between the wiping roller 732 and the side face 64, the wiping unit 73 transports the sheet 734 from the supplying roller 731 to the collecting roller 733. Accordingly, the sheet 734 wipes the ink and the cleaning liquid adhering to the side faces 64.

As shown in FIG. 6, the maintenance unit 70 further includes the second hoisting and lowering mechanism 78. The second hoisting and lowering mechanism 78 moves the wiping unit 73 up and down relative to the base frame 74 of the maintenance unit 70. Specifically, the second hoisting and lowering mechanism 78 moves the cleaning block 72 up and down between a second rising position at which the wiping roller 732 comes in contact with the side faces 64 of a head 61 and a second falling position lower than the second rising position. The second hoisting and lowering mechanism 78 may, for example, be an air cylinder.

The movement mechanism 80 is a mechanism for moving the maintenance unit 70 in the width direction. The movement mechanism 80 moves the maintenance unit 70 in the width direction relative to each head unit 60 located at the maintenance position. The movement mechanism 80 may, for example, be a direct-acting mechanism using a ball screw. Alternatively, the movement mechanism 80 may be a direct-acting mechanism configured by any other mechanism such as a linear motor.

Figure 10:
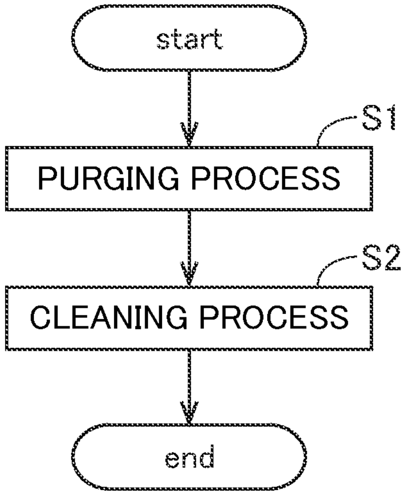
FIG. 10 is a flowchart showing a procedure of maintenance of a head unit.

The following description is given of the operation of performing the maintenance of the head units 60 using the maintenance unit 70 described above. FIG. 10 is a flowchart showing the procedure of maintenance of the head units 60. The following procedure proceeds as a result of the controller 3 controlling the operations of various parts of the printer 1 in accordance with the computer programs P.

For the maintenance of a head unit 60, first, the head unit 60 is moved from the printing position to the maintenance position. Then, the movement mechanism 80 arranges the maintenance unit 70 at the position shown in FIG. 6. At the position shown in FIG. 6, the cap 71 of the maintenance unit 70 is arranged under the head unit 60. Then, the head unit 60 is moved down by a head hoisting and lowering mechanism (not shown). Accordingly, the lower surfaces of the heads 61 are covered with the cap 71.

In this state, the printer 1 performs a purging operation (step S1: purging process). That is, the pressure mechanism 67 supplies ink to each head 61 of the head unit 60 while applying pressure to the ink. Accordingly, the ink is continuously ejected from the nozzles 65 of each head 61. The purging operation causes foreign materials in the ink or flocculation of the ink itself to be discharged from the nozzles 65. As a result, clogging in the nozzles 65 is resolved. However, the purging operation may cause the ink to adhere to the nozzle face 63 and side faces 64 of each head 61.

After the purging operation is performed for a predetermined period of time, the pressure mechanism 67 ends the application of pressure to the ink. This ends the purging operation. Then, the head hoisting and lowering mechanism moves the head unit 60 upward. Accordingly, the head unit 60 is moved above from the cap 71 and returns to the state shown in FIG. 6.

Figure 11:
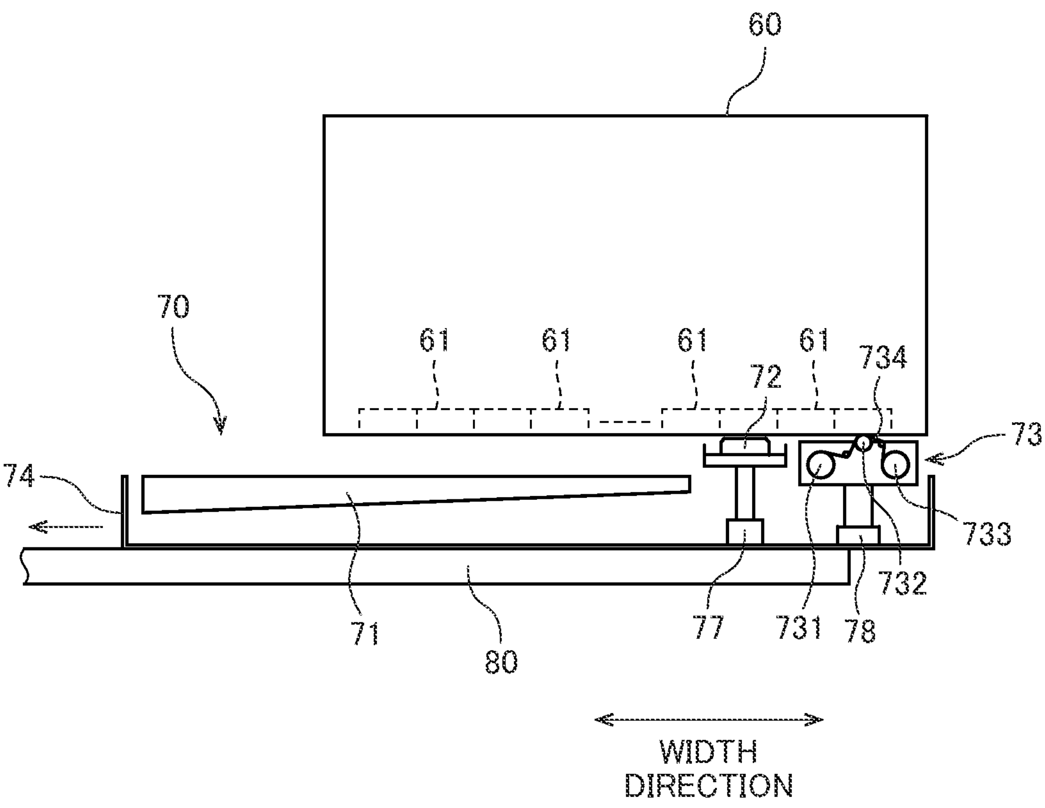
FIG. 11 is a diagram showing a cleaning process.

Next, the printer 1 performs cleaning of the heads 61, using the cleaning block 72 and the wiping unit 73 (step S2: cleaning process). FIG. 11 is a diagram showing how the cleaning process is performed.

In the cleaning process, the first hoisting and lowering mechanism 77 moves the cleaning block 72 from the first falling position to the first rising position. Then, the cleaning liquid supplier 75 and the suction part 76 are operated to start the ejection of the cleaning liquid from the supply holes 721 and the suction of the cleaning liquid into the vacuum holes 722. Moreover, the second hoisting and lowering mechanism 78 moves the wiping unit 73 from the second falling position to the second rising position. Then, the transport of the sheet 734 from the supplying roller 731 to the collecting roller 733 is started.

In this state, the movement mechanism 80 moves the maintenance unit 70 in the width direction. The travel direction of the maintenance unit 70 is a direction from the wiping unit 73 toward the cap 71. Accordingly, the cleaning block 72 moves in the width direction along the lower surfaces of the heads 61 while performing the ejection of the cleaning liquid from the supply holes 721 and the suction of the cleaning liquid into the vacuum holes 722.

The cleaning liquid ejected from the supply holes 721 is supplied to the nozzle face 63 and the pair of side faces 64 of each head 61. Then, the ink and the cleaning liquid adhering to the nozzle face 63 and the pair of side faces 64 are sucked into the vacuum holes 722. Accordingly, the nozzle face 63 and the pair of side faces 64 are cleaned. Along with the movement of the cleaning block 72, the nozzle faces 63 and the side faces 64 of all of the heads 61 are cleaned.

During the movement of the maintenance unit 70, wiping by the wiping unit 73 is also performed following the cleaning by the cleaning block 72. The wiping unit 73 transports the sheet 734 from the supplying roller 731 to the collecting roller 733 while bringing the sheet 734 supported by the wiping roller 732 into contact with the pair of side faces 64 of each head 61. Accordingly, the ink and the cleaning liquid remaining on the side faces 64 are wiped with the sheet 734. Along the movement of the cleaning block 72, the ink and the cleaning liquid are wiped from the side faces 64 of all of the heads 61.

As described above, the maintenance unit 70 removes clogging in the nozzles 65 by the purging operation and thereafter removes the ink adhering to the lower surfaces of the heads 61 by the cleaning block 72 and the wiping unit 73. Accordingly, the conditions of the heads 61 can be maintained in good condition.

In particular, the maintenance unit 70 has the vacuum holes 722 only in the second regions A2 of the upper surface of the cleaning block 72 that face the side faces 64 of the heads 61. Accordingly, the suction force acting on the nozzle face 63 of each head 61 becomes smaller than the suction force acting on the side faces 64. Besides, the suction force of the vacuum holes 722 forms not a downward flow of the gas, but a flow of the gas along the nozzle face 63 below the nozzle face 63. This reduces the possibility that the ink may be sucked out from the inside of the nozzles 65. As a result, it is possible to satisfactorily maintain ink meniscus inside the nozzles 65 and reduce the occurrence of ink ejection failures.

4. Variations

While one embodiment of the present invention has been described thus far, the present invention is not intended to be limited to the embodiment described above.

In the above-described embodiment, the suction force acting on the first region A1 is made smaller than the suction force acting on the second regions A2 by providing the vacuum holes 722 only in the pair of second regions A2 of the cleaning block 72, out of the first region A1 and the second regions A2. However, the vacuum holes 722 may also be provided in the first region A1. In this case, for example, the density of the vacuum holes 722 in the first region A1 (the number of vacuum holes 722 per unit area) may be made smaller than the density of the vacuum holes 722 in the second regions A2.

The opening size of the vacuum holes 722 provided in the first region A1 may be made smaller than the opening size of the vacuum holes 722 provided in the second regions A2. As another alternative, the suction force acting on the nozzle face 63 of each head 61 may be made smaller than the suction force acting on the side faces 64 by making the height of the first region A1 lower than the height of the second regions A2. As yet another alternative, different negative pressure generators 764 may be connected to the vacuum holes 722 provided in the first region A1 and the vacuum holes 722 provided in the second regions A2 so as to make the negative pressure generated in the vacuum holes 722 in the first region A1 smaller than the negative pressure generated in the vacuum holes 722 in the second regions A2.

In the above-described embodiment, the supply holes 721 and the vacuum holes 722 are provided in the upper surface of the cleaning block 72. However, the cleaning block 72 may not have the supply holes 721.

In the above-described embodiment, the maintenance unit 70 is moved in the width direction relative to the stationary head units 60 in step S2. However, the head units 60 may be moved in the width direction relative to the stationary maintenance unit 70. That is, in step S2, the maintenance unit 70 and the head unit 60 may be moved relative to each other in the width direction.

In the above-described embodiment, the cleaning of the heads 61 by the cleaning block 72 and the wiping unit 73 is performed after the purging operation. However, the cleaning of the heads 61 by the cleaning block 72 and the wiping unit 73 may be performed without the execution of the purging operation. Moreover, the cleaning of the heads 61 by the wiping unit 73 may be omitted.

In the above-described embodiment, each head unit 60 includes a plurality of heads 61 aligned in line in the width direction. However, each head unit 60 may include a plurality of heads 61 arranged in two or more rows. As another alternative, each head unit 60 may include a plurality of heads 61 arranged in a staggered manner.

In the above-described embodiment, the printer 1 includes the color printer 20 and the white printer 30. However, the printer 1 may include only the color printer 20. The number of head units 60 included in the printer 1 may also be different from the number described in the above embodiment.

The configuration of the details of the printer may be changed as appropriate without departing from the scope of the invention of the present application. Besides, each element cited in the above-described embodiment or variation may be combined or omitted as appropriate within a range that does not cause contraction.

While the invention has been shown and described in detail, the foregoing description is in all aspects illustrative and not restrictive. It is therefore understood that numerous modifications and variations can be devised without departing from the scope of the invention.

What is claimed is:

1. A printer for performing printing on a long band-like printing medium by an inkjet method, the printer comprising:

a head unit including a plurality of heads that eject ink, the plurality of heads being aligned in a width direction of the printing medium; and a maintenance unit that performs maintenance of the heads, wherein each of the heads has a lower surface that includes:

a nozzle face provided with a plurality of nozzles for ejecting ink; and a side face located adjacent to the nozzle face, wherein the maintenance unit includes:

a cleaning block that sucks ink from the lower surface of the head, wherein the cleaning block has an upper surface that includes:

a first region that faces the nozzle face; and a second region that faces the side face, wherein a suction force acting on the first region is smaller than a suction force acting on the second region, wherein the nozzle face and the side face extend in the width direction of the printing medium, wherein a length, in the width direction of the printing medium, of the upper surface of the cleaning block is smaller than a length, in the width direction of the printing medium, of the lower surface of the head unit, and wherein the printer further comprises a movement mechanism that moves the cleaning block relative to the head unit in the width direction of the printing medium.

2. The printer according to claim 1, wherein the cleaning block has an upper surface provided with a plurality of vacuum holes for sucking ink, and a density of the plurality of vacuum holes in the first region is smaller than a density of the plurality of vacuum holes in the second region.

3. The printer according to claim 2, wherein the plurality of vacuum holes are not provided in the first region.

4. The printer according to claim 1, wherein the side face protrudes downward from the nozzle face.

5. The printer according to claim 1, further comprising:

a pressure mechanism that supplies ink to the head while applying pressure to the ink so as to continuously eject the ink from the plurality of nozzles.

6. The printer according to claim 1, wherein the cleaning block further includes:

a plurality of supply holes for supplying a cleaning liquid to the lower surface of the head.

7. The printer according to claim 6, wherein the plurality of supply holes are provided in both of the first region and the second region.

8. A maintenance method for performing maintenance of a head of a printer that performs printing on a long band-like printing medium by an inkjet method, the maintenance method comprising:

a cleaning operation of sucking ink adhering to a lower surface of the head into a cleaning block, wherein the printer includes a head unit including a plurality of heads that eject ink, the plurality of heads being aligned in a width direction of the printing medium, wherein each of the heads has the lower surface that includes:

a nozzle face provided with a plurality of nozzles for ejecting ink; and a side face located adjacent to the nozzle face, wherein the cleaning block has an upper surface that includes:

a first region that faces the nozzle face; and a second region that faces the side face, wherein a suction force acting on the first region is smaller than a suction force acting on the second region, wherein the nozzle face and the side face extend in the width direction of the printing medium, wherein a length, in the width direction of the printing medium, of the upper surface of the cleaning block is smaller than a length, in the width direction of the printing medium, of the lower surface of the head unit, and wherein the cleaning block is moved relative to the head unit in the width direction of the printing medium.

9. The maintenance method according to claim 8, further comprising:

a purging operation of supplying ink to the head while applying pressure to the ink so as to continuously eject the ink from the plurality of nozzles, wherein the cleaning operation is performed after the purging operation.

10. The maintenance method according to claim 8, wherein in the cleaning operation, the cleaning block sucks the ink while supplying a cleaning liquid to the lower surface of the head.

11. The maintenance method according to claim 8, wherein in the cleaning operation, the cleaning block sucks the ink while moving in the width direction relative to the head.

* * * * *